(12) United States Patent
Nagel et al.

(10) Patent No.: US 9,796,886 B2
(45) Date of Patent: Oct. 24, 2017

(54) ADHESIVE TAPE FOR A FLYING ROLL CHANGE

(75) Inventors: Christoph Nagel, Hamburg (DE); Michael Schwertfeger, Hamburg (DE); Christian Bruns, Hamburg (DE)

(73) Assignee: TESA SE, Norderstedt (DE)

( * ) Notice: Subject to any disclaimer, the term of this patent is extended or adjusted under 35 U.S.C. 154(b) by 0 days.

(21) Appl. No.: 12/246,880

(22) Filed: Oct. 7, 2008

(65) Prior Publication Data

US 2009/0092779 A1    Apr. 9, 2009

(30) Foreign Application Priority Data

Oct. 8, 2007  (DE) .................... 10 2007 048 280

(51) Int. Cl.
| | | |
|---|---|---|
| B32B 33/00 | (2006.01) | |
| B65H 19/18 | (2006.01) | |
| C09J 7/02 | (2006.01) | |
| B32B 7/12 | (2006.01) | |
| B65H 19/10 | (2006.01) | |
| B32B 15/12 | (2006.01) | |
| B32B 25/12 | (2006.01) | |

(52) U.S. Cl.
CPC .............. *C09J 7/0296* (2013.01); *B32B 7/12* (2013.01); *B32B 15/12* (2013.01); *B32B 25/12* (2013.01); *B65H 19/102* (2013.01); *B32B 2405/00* (2013.01); *B65H 2301/41766* (2013.01); *B65H 2511/512* (2013.01); *B65H 2515/714* (2013.01); *C09J 2203/342* (2013.01); *C09J 2400/163* (2013.01); *C09J 2400/283* (2013.01); *Y10T 428/14* (2015.01)

(58) Field of Classification Search
CPC ................................. B32B 33/00; B65H 19/18
See application file for complete search history.

(56) References Cited

U.S. PATENT DOCUMENTS

| | | | |
|---|---|---|---|
| 4,833,193 A | | 5/1989 | Sieverding |
| 5,095,240 A | * | 3/1992 | Nysen et al. ............. 310/313 R |
| 5,323,981 A | * | 6/1994 | Dionne ...................... 242/556.1 |
| 6,432,241 B1 | * | 8/2002 | Congard et al. ............. 156/157 |
| 6,887,328 B1 | * | 5/2005 | Smith et al. .................. 156/157 |
| 7,240,873 B2 | * | 7/2007 | Eikmeier et al. .......... 242/555.3 |
| 2002/0182435 A1 | * | 12/2002 | Migliorini et al. ........... 428/626 |
| 2004/0028895 A1 | * | 2/2004 | Yamakami et al. .......... 428/354 |
| 2004/0256517 A1 | * | 12/2004 | Gassner et al. ............... 242/570 |
| 2005/0042449 A1 | * | 2/2005 | Phillips et al. ............... 428/375 |
| 2005/0173541 A1 | * | 8/2005 | Inoue et al. .................. 235/492 |
| 2007/0095451 A1 | * | 5/2007 | Kramp ........................... 156/64 |

(Continued)

FOREIGN PATENT DOCUMENTS

| | | |
|---|---|---|
| DE | 196 28 317 | 1/1998 |
| DE | 198 41 609 | 3/2000 |

(Continued)

*Primary Examiner* — Cheng Huang
(74) *Attorney, Agent, or Firm* — Norris McLaughlin & Marcus P.A.

(57) ABSTRACT

An adhesive tape for the flying roll change of flat web material wound on rolls has a carrier having a leading side and a trailing side. An optically detectable means and an exposable self-adhesive compound are arranged on the leading side. A cleavable adhesive system is located on the trailing side. An inductively detectable means is arranged in the adhesive tape in a visually inconspicuous manner.

14 Claims, 2 Drawing Sheets

(56) References Cited

U.S. PATENT DOCUMENTS

2007/0145150 A1* 6/2007 Barczyk et al. .............. 235/492
2010/0021668 A1* 1/2010 Shimokawa et al. ........ 428/40.2

FOREIGN PATENT DOCUMENTS

| DE | 199 02 179 | 9/2000 | |
|----|---|---|---|
| DE | 101 41 378 | 4/2003 | |
| DE | 10 2004 040 814 | 3/2006 | |
| EP | 1 041 025 | 4/2000 | |
| EP | 1 076 026 | 2/2001 | |
| EP | 1 347 028 | 9/2003 | |
| EP | 1 640 301 | 3/2006 | |
| JP | 2002 220572 | 8/2002 | |
| JP | WO 2008072462 A1 * | 6/2008 | ............... C09J 5/06 |
| WO | 95 29115 | 11/1995 | |
| WO | 03 018453 | 3/2003 | |
| WO | 03 018454 | 3/2003 | |
| WO | 03 018451 | 10/2008 | |
| WO | 03 018452 | 10/2008 | |

\* cited by examiner

ADHESIVE TAPE FOR A FLYING ROLL CHANGE

The invention relates to an adhesive tape for the flying roll change of flat web material wound on rolls and also to the use of an adhesive tape of this type.

In the processing of flat web material (paper, foils, nonwovens or the like), the flying roll change is an established process for replacing an old roll which has almost been unwound with a new roll without having to stop the high-speed machines. During flying roll changes of this type, contact adhesive tapes are frequently used to connect the end of the old web to the start of the new web.

In the paper, foil and nonwoven processing industry, a flying roll change (also referred to as a "dynamic roll change") is carried out using two different processes.

In the case of the first process, double-sided self-adhesive tapes are bonded manually to the start of the web of the new roll in an advantageous arrangement (conventionally in a W- or V-shaped arrangement), and the web material protruding beyond the adhesive tape is separated off. In addition, the start of the web of the new roll is fixed to the turn located therebelow of the new roll using what are known as securing labels to prevent the web from unwinding when the new roll is accelerated to the surface velocity of the old roll. A drawback of this process is the fact that the preparation of the rolls is very time consuming and the bonding requires the deployment of skilled personnel. In addition, the process does not always lead to the desired results, as the bonds obtained in this way are relatively thick owing to the layering of web material, securing labels and adhesive strips. Furthermore, it can occur, specifically in the case of thin, flexible web materials, that at the start of a new web the stream of air in the opposite direction that occurs in the course of the rotation causes bulges to appear in the web material, and this can generally lead to poor bonding of the webs.

In the case of the second known process, a two-sided self-adhesive tape is bonded in a straight line below or above the top layer of the roll-like material.

U.S. Pat. No. 5,323,981 discloses a two-sided adhesive tape having on the leading side a high tack adhesive compound for a flying roll change. Positioned on the trailing side are two adhesive compound portions which advantageously have an adhesive compound-free zone between the portions. In this case, the rear adhesive compound portion, which is permanently adhesive, is bonded to the top layer of the new roll and the front adhesive compound portion, which is repositionable, is adequately bonded to the second layer via the top layer. The repositionable adhesive compound portion acts in this variation as a roll lock. In the case of a flying roll change, the expiring web enters into contact with the new roll on the leading side of the adhesive tape. The repositionable adhesive compound portion becomes detached from the material of the second layer, and the new roll is drawn into the machine, held by the permanently adhesive compound at the end of the adhesive tape.

WO 95/29115 A discloses a similar adhesive tape. This two-sided adhesive tape has on the upper side (leading side) two adhesive compounds and on the underside (trailing side) one adhesive compound. The adhesive tape is fixed below the top layer of the new roll. In this case, one adhesive compound of the upper side secures the top layer. The second adhesive compound on the upper side is responsible for the contact with the expiring web. On the underside there is a repositionable adhesive compound which, in the case of the splice, i.e. when the new roll comes into operation, exposes the top layer thereof.

These two previously known adhesive tapes have a common drawback. That is to say, in the case of both tapes, the repositionable adhesive compound is opened up by the finishing machine, i.e. the machine in which the flat web material is processed, so that webs can become stuck to deflection rolls or printing blankets can occur, and this can again lead to web breaks.

An improvement to this problem is taught by DE 196 28 317 A. The adhesive tape disclosed therein is similar in its construction to that according to WO 95/29115 A, although the repositionable adhesive compound of the trailing side is replaced by a two-sided adhesive tape with a cleavable carrier (referred to generally as a "cleavable system"). In the case of the splice, the carrier cleaves, so that the top layer of the new roll becomes detached from the second layer and covers with the respective cleavage remains the adhesive compounds in such a way that said adhesive compounds remain non-adhesive. This prevents disruptive bonds on passing through the finishing machines.

A further improvement is taught by DE 199 02 179 A. In this case, the cleavage strip is set back by the leading edge of the new roll. This setting-back allows the splice efficiency to be significantly increased.

DE 198 41 609 A describes a two-sided adhesive element, the carrier of which consists not of a single-layer paper, but rather of a paper/paper composite which is connected to curing adhesive points. This adhesive element is also bonded below the top layer of the new roll. In the case of the splice, the adhesive points tear paper fibres out of one of the composite papers, and the top layer is thus exposed.

In the case of paper finishing machines, particularly printing machines, on the one hand the connecting point has to be detected during the preparation of the roll change, on the other hand the remains of the adhesive tape (also known as the "splice", referred to hereinafter as "splice remains" to avoid misunderstandings) have to be detected later in the finished printed product so as to be discarded. For this purpose, there are different methods and thus also different requirements placed on the adhesive tape.

The position of the adhesive tape for the splice in the roll changer can be detected optically or inductively.

WO 03/018451 A describes an adhesive tape which on the contact side toward the expiring web is dyed, preferably black, in such a way as to ensure optical detection and thus timely triggering of the splice. The side which is dyed for the purposes of detection points in the case of the adhesive tape (based on the new roll) radially outward, so that sensors on the roll changer can detect the adhesive tape. The dyeing can be carried out by imprinting the carrier material on the side on which the adhesive compound is later layered for contact with the expiring web.

EP 1 041 025 A describes an adhesive tape having a carrier with aluminium foil via which inductive detection is triggered.

The splice remains in the finished printed product can be detected using labels which protrude beyond the edge of the roll. However, this process harbours the potential error of the labels becoming lost in the printing process, so that the splice remains cannot be reliably discarded. Furthermore, a few additional copies must always be discarded to ensure that all copies with a splice remain are also discarded.

Inductive detection offers the advantage of allowing the splice remains to be reliably discarded, and it is also possible to discard each individual copy containing a splice remain.

It is therefore necessary to discard many fewer copies, and this manifests itself in a reduction of costs.

Further adhesive tapes for a flying roll change that offer detection possibilities are known from WO 03/018452 A, WO 03/018453 A and WO 03/018454 A.

Printing machines which optically determine the position of the splice in the roll changer, but inductively lock out the splice remains from the printed product, are problematic. Nowadays, in this regard, at least one label must in any case additionally be bonded to the adhesive tape.

The most recent printing machines now place a highly specific demand on the adhesive tape. On the one hand, the adhesive tape has to be precisely detected at the start of the roll change process in order to allow the position of the adhesive tape to be reliably determined and the splice thus also to be reliably implemented. On the other hand, the splice remains in the finished printed product have to be reliably detected in order to ensure the locking-out of the printed products containing a splice remain. In addition, there is now the requirement that none of the detectable additions after the splicing process may be visible on passing through the printing machine. That is to say, modern printing machines have a sensor so as to be able rapidly to recognize breaks and to be able rapidly to stop the printing process in order to keep losses low. Now, if one of the detectable additions is obviously recognizable, the sensor recognizes no longer the normal paper, but rather for example the aluminium foil or the black dyeing, and can detect as a paper break that which then leads to malfunctions in the ongoing process.

It is therefore the object of the invention to provide an adhesive tape for the flying roll change of flat web material wound on rolls, which adhesive tape is reliable and secure in application and does not lead to malfunctions in the case of the most recent printing machines described.

This object is achieved by an adhesive tape for the flying roll change of flat web material wound on rolls having the features described hereinbelow.

The adhesive tape according to the invention is optically detectable on its leading side, such as is required for the preparation and the sequence of the flying roll change, i.e. for the splice. During the subsequent pass through a finishing machine, for example a printing machine for paper, the splice remains can be inductively recorded. As the inductively detectable means (preferably an aluminium foil) is arranged in a visually inconspicuous manner, the above-described most recent printing machines also operate without malfunctions. The term "visually inconspicuous (visually neutral)" means in particular that the inductively detectable means is not recognized by a sensor, which is intended to detect paper breaks, or is not differentiated from a normal paper surface, with regard to which the sub-claims and the subsequently described exemplary embodiments specify certain embodiments.

BRIEF DESCRIPTION OF THE DRAWINGS

The invention will be described hereinafter in greater detail with reference to exemplary embodiments. In the drawings

Figure 1:
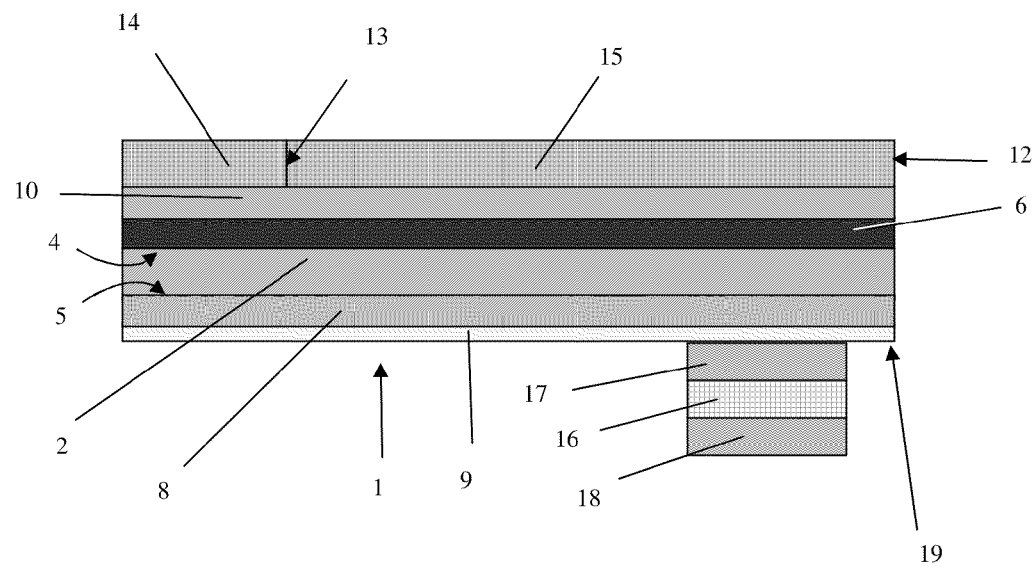
FIG. 1 is a schematic cross section through a first embodiment of the adhesive tape according to the invention.

A first embodiment of the adhesive tape will first be described, wherein reference will also be made to more general aspects.

Provided as the carrier, in the case of the first embodiment, is a kraft paper which is smooth on both sides, has a thickness of for example 55 µm and a basis weight of 65 g/m$^2$ and is imprinted on one side (referred to hereinafter as the leading side) with a black printing ink. Advantageously, the kraft paper can be enamelled, leading to better securing of the printing ink. The important thing about the paper is its physical properties, above all the tear strength. The tear strength must be higher than the web stresses in the printing machine which is used or other processing machines. In the case of machines having lower web stresses, the paper can also be selected so as to be thinner. This would have advantages for the processing operation, as thinner materials disturb the pass through the machine less.

An aluminium foil is in a further process laminated onto the side of the carrier that opposes the imprint (referred to hereinafter as the trailing side) as an inductively detectable means. The aluminium foil is generally present in a thickness of from 6 µm to 12 µm. However, depending on the type of sensor, it can also be thinner or thicker. In this case too, thinner composites disturb the pass through the machine less than thick composites. The lamination can for example be carried out via a two-component adhesive or by means of polyethylene. Processes for generating a composite of this type are sufficiently well known. The foil can be of the same width as the carrier paper, although it can also be more slender in use. This aluminium foil is imprinted with a white printing ink. This ensures that a sensor for breaks is not disturbed in a modern printing machine as a result of the pass of the aluminium foil and thus also does not detect or report any breaks.

This multiple composite is coated on the side imprinted black (i.e. the leading side) with an adhesive compound (self-adhesive compound). The adhesive compound must be a high tack compound, i.e. have high tack forces and display high adhesive forces.

In the exemplary embodiment, the adhesive compound is covered with a silicone-treated material, preferably a silicone paper. If the adhesive tape is treated manually, this detachable cover can have slots, i.e. be segmented, thus allowing the resulting partial pieces to be removed separately from one another. If, on the other hand, the adhesive tape is to be used in an automatic process, an unslotted cover material can be more advantageous. For manual bonding, the cover material is preferably paper, as it can then be torn by hand. In the case of an automatic application, the cover material can also consist of a foil, as in this case the adhesive tape with the cover is cut by machine.

The manner in which the tack force of the adhesive compound can be measured is illustrated by the following example:

The tack was determined as follows: What is known as the rolling ball tack was measured as a measure of the tack at a very short contact time. A standard polyester carrier having a thickness of 23 µm of the respective self-adhesive compound was coated on one side as the sample to be examined (application of self-adhesive compound after evaporation of the solvent: 50 g/m$^2$). An approximately 10 cm long strip of the adhesive tape was fastened horizontally on the test plane with the adhesive side facing upward. A sample ball made of steel (diameter: 11 mm; mass: 5.6 g) was cleaned with acetone and conditioned for 2 h in an atmospheric environment (temperature: 23° C.+/−1° C.; relative humidity: 50%+/−1%). For measuring, the steel ball was accelerated under gravity by rolling down a 65 mm high ramp (angle of inclination: 21°). From the ramp, the steel ball was guided directly onto the adhesive surface of the sample. The distance covered on the adhesive compound before the ball was stationary was measured. The length of the rolling distance thus determined serves in this case as an inverse measure of the tack of the self-adhesive compound (i.e. the shorter the rolling distance, the higher the tack, and vice versa). The respective measured value was obtained (as a length specified in mm) from the mean value of five individual measurements.

The measurement of the adhesive force is described in the following example:

The adhesive force was in this case determined as follows: The paper side of a single-side adhesive SC (super calendered) paper placed onto an underlay was used as the defined adhesion or test substrate (adhesive force plate). A standard polyester carrier having a thickness of 23 µm was coated on one side with the respective self-adhesive compound as the sample to be examined (application of self-adhesive compound after drying of the solvent: 50 g/m$^2$). A 20 mm wide strip of the coated standard polyester carrier was pressed onto the SC paper under loading (2 kg). Immediately thereafter, the adhesive tape was removed from the substrate at an angle of 180° and at a speed of 300 mm/min and the force required for this purpose at room temperature was measured. The measured value (in N/cm) was obtained as the mean value from three individual measurements.

In specific embodiments, the adhesive compound of the contact side (leading side), i.e. the side pointing radially outward after bonding onto a new roll, can have increased shear values. The shear strength is in this case measured as follows:

For measuring the shear strength of adhesive compounds, the compounds are layered onto a standard carrier (polyester film; thickness: 25 µm). Advantageously, a constantly uniform application of compound of 25 g/m$^2$ is selected. After drying and optional crosslinking of the adhesive compound, a strip having a width of 13 mm and a length of at least 20 mm is cut out and bonded to a defined paper (for example rotogravure paper, for example Neopress T 54, 54 g/m$^2$, or coating base paper, for example Mediaprint, 135 g/m$^2$). The bonding surface area is 13 mm×20 mm. To ensure constant contact pressure during bonding, the test item is rolled over twice slowly with a roll (weight: 2 kg). The test specimen thus produced is loaded with a weight of 1 kg parallel to the bonding plane and the time for which the adhesive strip remains on the paper is measured. For better differentiation of the individual adhesive compounds, the test is carried out accordingly at further test temperatures (for example 40° C. and 70° C.).

A product of this type having elevated shear values is used in particular in printing machines containing, in addition to a cold-set printing unit, also a heat-set printing unit. In the future, this will increasingly often be the case, as printing machine effectiveness can be increased in this way.

A cleavable system is applied on the side opposing the cover (trailing side), allowing the top layer of a new roll with flat web material to be fixed on the layer located therebelow, as described at the outset. This cleavable system can have a broad range of embodiments.

As described in DE 199 02 179 A, it may be a paper which is coated on both sides with adhesive compound and cleaves within itself when subjected to loads in the Z direction and thus covers the adhesive compounds necessary for bonding. Loads in the Z direction are force components perpendicular to the plane of the carrier, such as occur when the flat web material is rolled from the new roll and the top layer becomes detached from the layer located therebelow. Both the adhesive compound pointing toward the trailing side of the carrier and the adhesive compound on the other side of the paper may be self-adhesive compounds. However, curing adhesive compounds may also be applied.

Curing adhesive compounds for the carrier have the advantage that they can be applied in lower layer thicknesses and thus reduce the thickness of the system as a whole. Curing adhesive compounds on the other side, i.e. the side to be bonded to the web material, offer the advantage that particularly difficult bonding substrates are bonded securely. Adhesive compounds of this type are activated for example by water or other solvents or heat. Although the use of adhesive compounds of this type requires more time, for the adhesive compound has to be activated and the adhesive tape applied and the adhesive compound has subsequently to cure, this can be achieved in current-day production cycles, as many of these operate with central splice preparation. In this case, the rolls are generally prepared 6 hours to 8 hours in advance.

Instead of a single-layer paper, use may also be made of a paper/paper composite, as described in EP 1 076 026 A, a paper/foil composite or a foil/foil composite.

The cleaving force of all of the described systems should be between 15 cN/cm and 70 cN/cm.

A specific example of the first embodiment of the adhesive tape will now be described with reference to FIG. 1. FIG. 1 is a schematic cross section through the adhesive tape which is denoted by reference numeral 1 and is shown not true to scale and in particular greatly exaggerated in size. The width direction of the adhesive tape 1 extends from left to right and thus in application in the longitudinal direction of the flat web material to be connected to the adhesive tape 1.

A kraft paper 2 which is smooth on both sides as a carrier having a thickness of for example 55 µm and a basis weight of 65 g/m$^2$, with a leading side 4 (i.e., top side 4) and a trailing side 5 (i.e., bottom side 5), is imprinted with a layer 6 with black printing ink as the optically detectable means. As described hereinbefore, it may be a single-sided or double-sided enamelled paper. The imprinting is carried out on the leading side 4, i.e. on the side which points radially outward when the adhesive tape 1 is bonded onto a new roll with flat web material.

An aluminium foil 8 is laminated onto the side opposing the layer 6, i.e. the trailing side 5, as an inductively detectable means. The aluminium foil is imprinted with dye on the side pointing radially inward, thus forming a cover layer 9, so that the aluminium of the aluminium foil 8 is not visible. This dye is preferably white, i.e. paper-like.

A high tack self-adhesive compound 10 (pressure sensitive adhesive, contact adhesive compound) is applied above the layer 6. The self-adhesive compound can be transparent, so that the black imprinting of the layer 6 shines through, or can itself be dyed dark to improve detectability. The self-adhesive compound 10 is covered by a detachable cover 12 which is divided into two segments 14, 15 by a slot 13.

Positioned on the cover layer 9 is a cleavable system which in the exemplary embodiment according to FIG. 1 consists of a cleavable paper 16 and two adhesive compounds 17 and 18 configured as self-adhesive compounds.

The positioning thereof is carried out advantageously offset by 1 mm to 15 mm from the edge 19 of the adhesive tape 1 (see FIG. 1).

Figure 2:
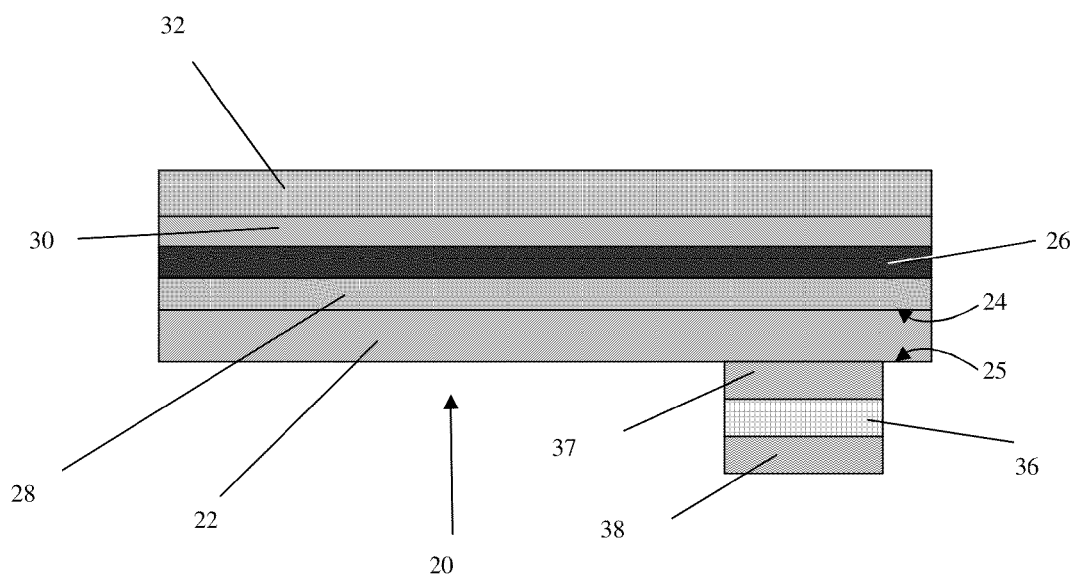
FIG. 2 is a schematic cross section through a second embodiment of the adhesive tape according to the invention.

FIG. 2 shows a second embodiment of the adhesive tape which is denoted in this case by reference numeral 20 and in which the sequence of layers is different to that in the adhesive tape 1.

A kraft paper 22 which is smooth on both sides as a carrier having a thickness of for example 55 μm and a basis weight of 65 g/m², and with a leading side 24 and a trailing side 25, is laminated on its leading side 24 with an aluminium foil 28. The thickness of the aluminium foil 28 is again between 6 μm and 12 μm. The inductively detectable means in the form of the aluminium foil 28 is therefore in this case, unlike in the first embodiment, arranged on the leading side 24. This composite is imprinted black on the aluminium foil 28 to produce an optically detectable layer 26. A high tack self-adhesive compound 30 (contact adhesive compound) is again applied thereabove and covered with a detachable cover 32. The cover 32 is not segmented, i.e. does not have any slots, and this is more advantageous in the case of an automatic application of the adhesive tape 20.

Provided on the trailing side is again a cleavable system having, as in the embodiment according to FIG. 1, a cleavable paper 36 and two self-adhesive compounds 37, 38.

Figure 3:
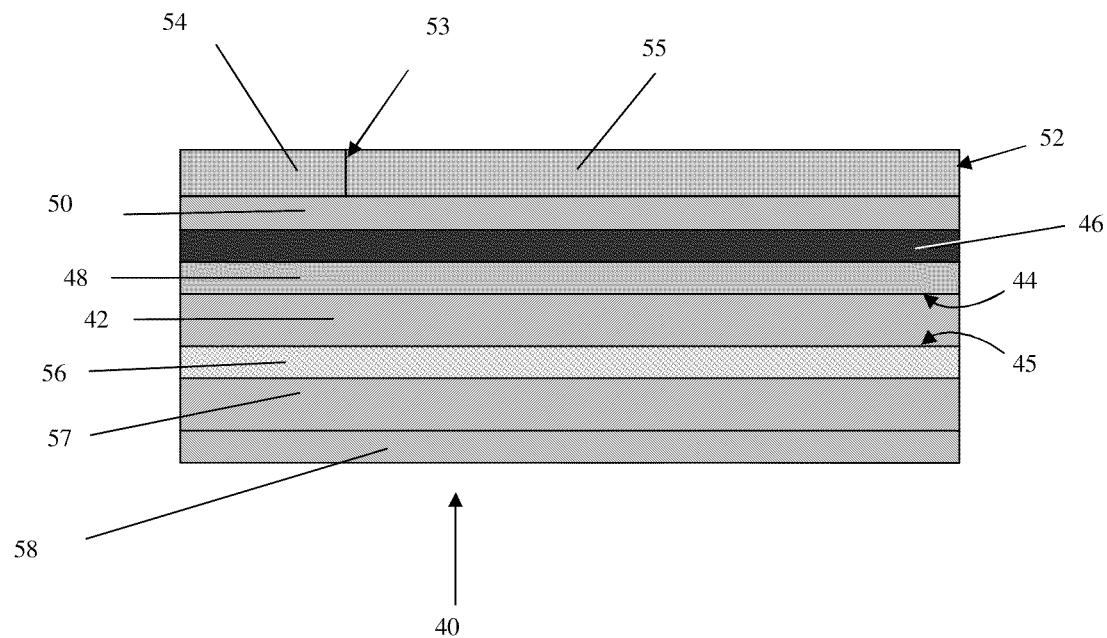
FIG. 3 is a schematic cross section through a third embodiment of the adhesive tape according to the invention and FIG. 4 is a schematic cross section through a fourth embodiment of the adhesive tape according to the invention.

FIG. 3 shows a third embodiment of the adhesive tape, denoted in this case by reference numeral 40.

A kraft paper 42 which is smooth on both sides as a carrier having a thickness of for example 55 μm and a basis weight of 65 g/m², and with a leading side 44 and a trailing side 45, is laminated with an aluminium foil 48. Imprinting 46 with dye and the lamination of a contact adhesive compound 50 are carried out onto the laminated aluminium foil 48. The contact adhesive compound 50 is covered with a detachable cover 52 which is segmented by a slot 53 into two portions 54 and 55, but can also be present in one piece.

A paper layer 57 is laminated onto the trailing side 45 of the carrier 42, as described in EP 1 076 026 A, by means of a laminated coat 56. This may be the same paper as for the carrier 42. In order to reduce the total thickness of the system, and as the paper layer 57 does not have to absorb any web stress, a relatively thin paper is preferably used. This paper layer 57 is then again provided with an adhesive compound 58 which may be similar to the contact adhesive compound 50. However, in this case too, lower applications of compound are positive for the total thickness. On the other hand, this side of the adhesive tape 40 is manually bonded, i.e. the technical requirements placed on the adhesive compound 58 are not as high as those placed on the adhesive compound 50. During the splice, the paper layer 57 on the laminated coat 56 becomes detached from the carrier 42, so that no tacky splice remains are produced.

Figure 4:
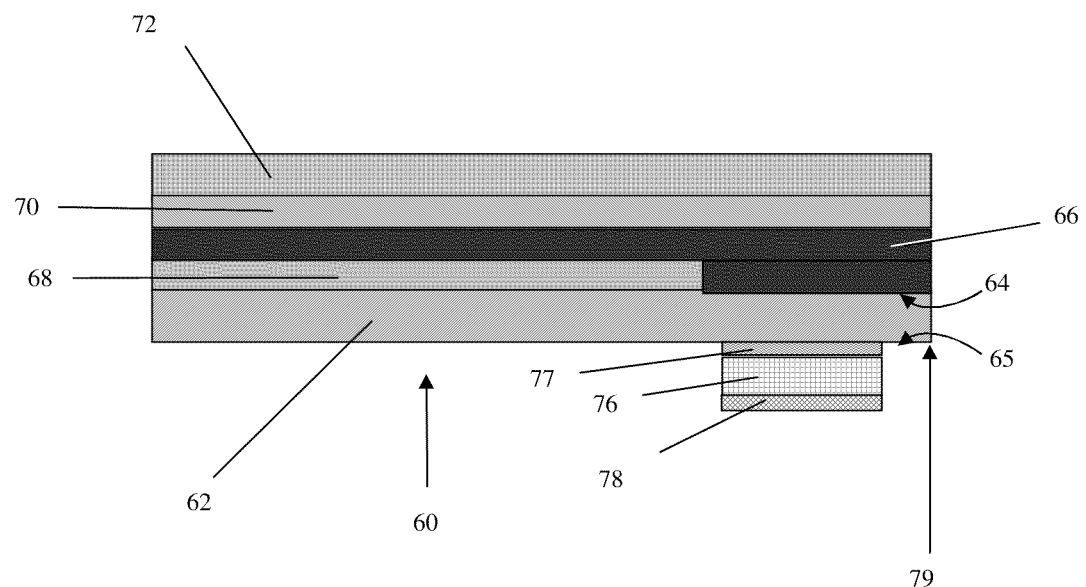

FIG. 4 shows a fourth embodiment of the adhesive tape, denoted in this case by reference numeral 60.

A kraft paper 62 which is smooth on both sides as a carrier having a thickness of for example 55 μm and a basis weight of 65 g/m² is laminated on its leading side 64 with an aluminium foil 68. The aluminium foil 68 is in this case less wide than the product as a whole. The width of the aluminium foil 68 is reduced by the width of the cleavable system 76, 77, 78 plus a defined distance from the edge 79. There is thus no overlap between the cleavable system 76, 77, 78 and the aluminium foil 68. This has a positive effect on the flexibility, in particular of the front region. This improves the machinability. This composite is imprinted over its entire width on the aluminium side (layer 66) and laminated with a contact adhesive compound 70 and covered with a detachable cover 72.

The cleavable system consists in this case of a single-layer paper 76 which cleaves under loading in the Z direction. The adhesive compounds 77, 78 are not self-adhesive compounds, but rather adhesive compounds which become activated (tacky) after activation, for example by solvents (organic or water) or heat, and then solidify by way of evaporation or cooling. These adhesive compounds can offer advantages in the case of substrates which must particularly critically be bonded.

The application of the described embodiments of the adhesive tape is obtained from the foregoing.

What is claimed is:

1. An adhesive tape for the flying roll change of flat web material wound on rolls, comprising
    (a) a carrier having a top side and a bottom side,
    (b) an optically detectable layer arranged on the top side of the carrier,
    (c) an exposable self-adhesive compound arranged on the top side of the carrier, wherein the optically detectable layer is located between exposable self-adhesive compound and the top side of the carrier,
    (d) a cleavable adhesive system arranged adjacent to the bottom side of the carrier, wherein the cleavable adhesive system comprises a cleavable layer located between a first adhesive composition and a second adhesive composition, wherein the cleavable layer is adapted to cleave, after cleavage, into a first remain and a second remain, wherein the first remain covers the first adhesive composition and the second remain covers the second adhesive composition, and
    (e) an aluminum foil laminated onto the bottom side of the carrier, wherein the aluminum foil is imprinted with white dye forming a visually inconspicuous layer thereon, wherein the visually inconspicuous layer consists of the white dye and covers the aluminum foil such that aluminum of the aluminum foil is not visible, wherein the aluminum foil is positioned between the bottom side of the carrier and the visually inconspicuous layer, and further wherein the cleavable adhesive system is arranged on a side of the visually inconspicuous layer that is located opposite with respect to the aluminum foil.

2. The adhesive tape according to claim 1, wherein the optically detectable layer comprises a black printing ink.

3. The adhesive tape according to claim 1, wherein the exposable self-adhesive compound has a colored addition.

4. The adhesive tape according to claim 1, wherein the exposable self-adhesive compound is covered by a detachable cover.

5. The adhesive tape according to claim 4, wherein the detachable cover is segmented.

6. The adhesive tape according to claim 1, wherein the cleavable layer comprises a single-layer paper.

7. The adhesive tape according to claim 1, wherein at least one selected from the first adhesive composition and the second adhesive composition comprises at least one selected from an activatable adhesive compound, a curing adhesive compound and a self-adhesive compound.

8. The adhesive tape according to claim 1, wherein the cleavable layer comprises a composite comprising paper/paper, paper/foil material or foil material/foil material.

9. The adhesive tape according to claim 1, wherein the exposable self-adhesive compound on the top side comprises at least one substance selected from the group consisting of acrylate, natural rubber, and synthetic rubber.

10. The adhesive tape according to claim 1, wherein the exposable self-adhesive compound exhibits a rolling distance length of less than 40 mm.

11. The adhesive tape according to claim 1, wherein the exposable self-adhesive compound exhibits a rolling distance length in the range of from 40 mm to 100 mm.

12. The adhesive tape according to claim 1, wherein the carrier comprises a kraft paper.

13. The adhesive tape according to claim 1, wherein the aluminum foil has a thickness of from 6 μm to 12 μm.

14. A method of splicing a new roll of flat web material to an old unwinding roll of flat web material, said method comprising applying the adhesive tape according to claim 1 to a leading edge of said new roll of flat web material, setting said new roll of flat web material with the applied adhesive tape in motion, and contacting a trailing edge of said old unwinding roll of flat web material with the leading edge of said new roll of flat material while both are moving to splice the new roll of flat web material to the old unwinding roll of flat web material via said adhesive tape.

* * * * *